W. R. DIEHL & W. H. TOWNSEND.
KEYBOARD FOR TYPE WRITERS.
APPLICATION FILED MAY 19, 1915.
1,241,201. Patented Sept. 25, 1917.
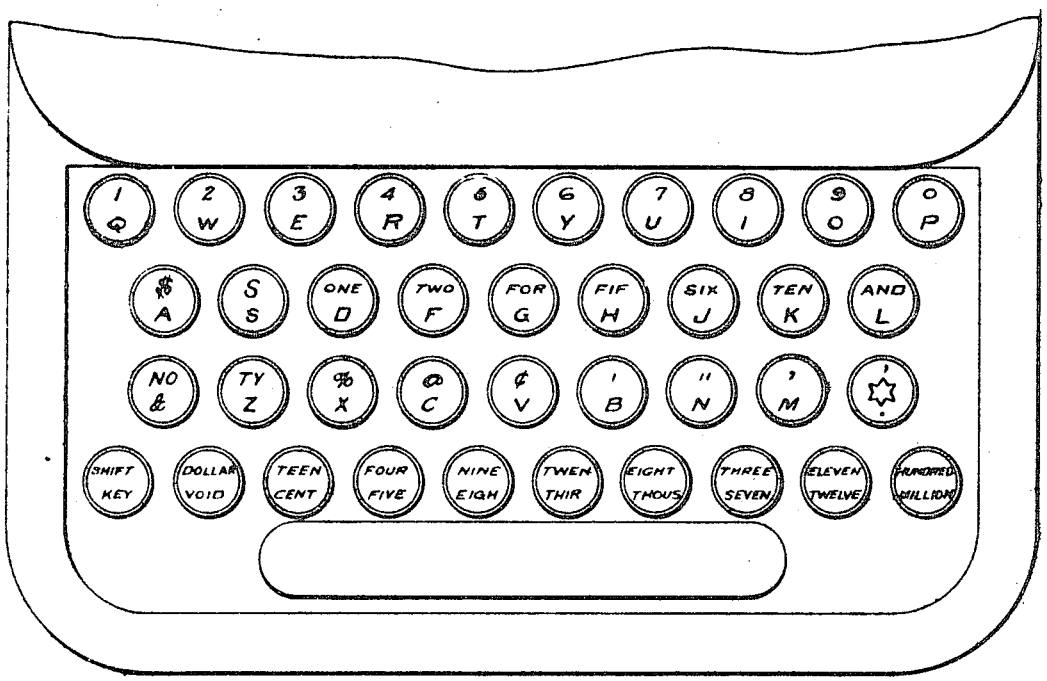
WITNESSES
INVENTORS
Walter R. Diehl and
Willard H. Townsend
by William B Wharton
their attorney

UNITED STATES PATENT OFFICE.

WALTER R. DIEHL AND WILLARD H. TOWNSEND, OF PITTSBURGH, PENNSYLVANIA.

KEYBOARD FOR TYPE-WRITERS.

1,241,201. Specification of Letters Patent. Patented Sept. 25, 1917.

Application filed May 19, 1915. Serial No. 29,151.

*To all whom it may concern:*

Be it known that we, WALTER R. DIEHL and WILLARD H. TOWNSEND, citizens of the United States of America, and residents of Pittsburgh, in the county of Allegheny and State of Pennsylvania, have invented certain new and useful Improvements in Keyboards for Type-Writers, of which the following is a specification.

This invention relates to an improvement in keyboards for typewriters.

The object of the invention is to provide a keyboard containing a specific arrangement of letters, digits, words, and syllables whereby financial instruments such as checks, drafts, notes, and dividend and payroll checks may be written with increased speed and accuracy. More specifically the object of the invention is to provide a typewriter keyboard containing an arrangement of digits, letters, words, and syllables whereby the name of the payee or drawee of a check or note may be written literally, and the amount of the check or note may be printed by means of a combination of keys bearing words and syllables and which are designed to print syllabically, by entire words, or by combinations of words and mutually connected syllables, or by any required combination of words, words with syllables, and mutually connected syllables any sum of United States money.

The accompanying drawing shows a plan view of a typewriter keyboard provided with keys bearing the syllables, letters, words, and digits essential in carrying out the purpose of the invention.

The letters of the alphabet are preferably of a single size, as of uniform block type, while the type upon the keys which carry complete words or syllables is smaller as shown, in order that syllables containing two or three letters may be conveniently placed on the same key as a letter of the alphabet. It is obvious, however, that where desired an additional bank of keys may be provided for the syllables, and that in such case the letters comprising the syllables may be of the same size as the alphabetical type. The words, syllables or abbreviations of the written numbers may each begin with a capital letter and be completed with small letters excepting the syllables "ty," "teen" and "and." Preferably, however, the written numbers are wholly printed in capital letters. The "S" key carries an "S" to conform with the letters of the written numbers and with each of the words "dollar" and "cent" as printed by a single key, to make the plural of dollar and cent. The written numbers from "one" to "twelve" are written or printed with a single stroke of the key. The remaining written numbers are syllabized as follows:—The syllable "teen" is provided to complete the written numbers ending in "teen," viz., thirteen to nineteen inclusive; the syllable "ty" to complete the written numbers ending in "ty," viz., from the twenties to the nineties inclusive; the syllable "twen" for writing the twenties; the syllable "thir" for writing the thirties and thirteen; the syllable "for" for writing the forties; the syllable "fif" for writing the fifties and fifteen; and so on; the syllable "thous" with the syllable "and" for thousand; the word dollar and the word cent together with the written numbers from one to twelve inclusive are written by a single stroke of a key. The numbers "fourteen", "sixteen", "seventeen", and "nineteen" are printed by the keys bearing the numbers "four", "six" and "nine" respectively together with the key bearing the syllable "teen"; the syllable "eigh" is also provided to be struck in combination with the keys bearing the syllables "teen" and "ty" to form the words "eighteen" and "eighty" respectively.

In filling out checks, drafts, or notes, the serial number and the amount for which the instrument is drawn may either or both be written in by the digital keys. The name of the person or corporation in whose favor the instrument is drawn is written with the alphabetical keys. The written words indicating monetary value of the instrument are printed by the syllabic keys. The usual keyboard arrangement of typewriters is preferably utilized in the alphabetical portion of the present keyboard in order to facilitate writing by an operator accustomed to the usual standard keyboards, while the syllabic keys are conveniently disposed for writing the amount of the check or note. It will be noted that, with the exception of the letter "s" to complete the words "dollars" and "cents," letters are combined with letters, while words are printed only in combination with words and syllables, as for example the word "six" with the syllable "ty" and the syllable "eigh" with the syllable "ty."

By means of the keyboard arrangement above described, checks, vouchers, drafts, and notes may obviously be filled out with great facility, all the words and syllables being provided for printing any sum of United States money which might occur in the course of business. The typewriter keyboard described is therefore a great improvement over the standard keyboard for general use in banks or in the accounting departments of large corporations, since an operator accustomed to the keyboard shown can turn out in a given time a far greater number of checks or notes than by the use of any prior type of keyboard. The keyboard is also entirely complete for the purpose, provision being made for writing alphabetically any name and printing syllabically any sum of money necessary in filling out the check.

What I claim is:—

In a typewriter, a check writing keyboard comprising the combination of keys bearing alphabetical letters for writing the name of the payee and words and syllables for printing syllabically the amount for which the check is drawn, the numbers having the common numerical terminations being printed syllabically by striking the proper combinations of keys and the numbers without such terminations being printed at a single stroke of a key, the type for printing words and syllables being such that the shorter words and syllables may be placed on the alphabetical keys to occupy the same line space as the alphabetical letters and being printed instead of the latter by means of a simple shift key operation.

In testimony whereof, we affix our signatures in the presence of two witnesses.

WALTER R. DIEHL.
WILLARD H. TOWNSEND.

Witnesses:
M. S. THOMPSON,
RICHARD TOWNSEND.